United States Patent
Xia et al.

(10) Patent No.: US 10,454,094 B2
(45) Date of Patent: Oct. 22, 2019

(54) CATHODE ACTIVE MATERIAL FOR LITHIUM-ION SECONDARY BATTERY AND PREPARATION METHOD THEREOF, CATHODE POLE PIECE FOR LITHIUM-ION SECONDARY BATTERY, AND LITHIUM-ION SECONDARY BATTERY

(71) Applicant: Huawei Technologies Co., Ltd., Shenzhen, Guangdong (CN)

(72) Inventors: Shengan Xia, Shenzhen (CN); Jun Yang, Shenzhen (CN); Pinghua Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 682 days.

(21) Appl. No.: 14/580,030

(22) Filed: Dec. 22, 2014

(65) Prior Publication Data

US 2015/0104697 A1   Apr. 16, 2015

Related U.S. Application Data

(63) Continuation of application No. PCT/CN2014/072477, filed on Feb. 25, 2014.

(30) Foreign Application Priority Data

Jul. 29, 2013   (CN) .......................... 2013 1 0323018

(51) Int. Cl.
*H01M 4/04* (2006.01)
*H01M 4/134* (2010.01)
(Continued)

(52) U.S. Cl.
CPC ....... *H01M 4/0471* (2013.01); *H01M 4/0416* (2013.01); *H01M 4/0428* (2013.01);
(Continued)

(58) Field of Classification Search
CPC .... H01M 4/133; H01M 4/1393; H01M 4/587; H01M 4/625
See application file for complete search history.

(56) References Cited

U.S. PATENT DOCUMENTS

| 6,541,156 B1 | 4/2003 | Fuse et al. |
| 2002/0164479 A1 | 11/2002 | Matsubara et al. |

(Continued)

FOREIGN PATENT DOCUMENTS

| CN | 101069588 A | 11/2007 |
| CN | 101210119 A | 7/2008 |

(Continued)

OTHER PUBLICATIONS

Yong Jae Cho et al., "Nitrogen-Doped Graphitic Layers Deposited on Silicon Nanowires for Efficient Lithium-Ion Battery Anodes", The Journal of Physical Chemistry, American Chemical Society, Apr. 22, 2011, p. 9451-9457.

(Continued)

*Primary Examiner* — Jason Berman
(74) *Attorney, Agent, or Firm* — James Anderson Harrison (57) ABSTRACT

Embodiments of the present invention provide a cathode active material for a lithium-ion secondary battery, where the cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire; a micropore is arranged on at least one of the exterior and the interior of the nitrogen-doped carbon material; and a material of the nitrogen-doped carbon material is a nitrogen-doped carbon network. The cathode active material for a lithium-ion secondary battery solves a problem in the prior art that a (Continued)

silicon material, when used as a cathode active material, easily falls from a current collector due to a great volume change and has a low conductivity.

7 Claims, 1 Drawing Sheet

(51) Int. Cl.
| | |
|---|---|
| *H01M 4/38* | (2006.01) |
| *H01M 4/62* | (2006.01) |
| *H01M 4/133* | (2010.01) |
| *H01M 4/1393* | (2010.01) |
| *H01M 4/1395* | (2010.01) |
| *H01M 4/36* | (2006.01) |
| *H01M 4/583* | (2010.01) |
| *H01M 4/587* | (2010.01) |

(52) U.S. Cl.
CPC ........ *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/583* (2013.01); *H01M 4/587* (2013.01); *H01M 4/625* (2013.01)

(56) References Cited

U.S. PATENT DOCUMENTS

| | | | | |
|---|---|---|---|---|
| 2003/0026755 | A1* | 2/2003 | Jaroniec | B01J 21/18 423/449.1 |
| 2011/0070495 | A1* | 3/2011 | Ban | H01M 4/485 429/221 |
| 2012/0164528 | A1* | 6/2012 | Xu | H01M 4/131 429/211 |
| 2013/0280603 | A1 | 10/2013 | Yoon et al. | |
| 2014/0087192 | A1* | 3/2014 | Lai | H01G 11/36 428/409 |
| 2014/0147751 | A1 | 5/2014 | Yang et al. | |

FOREIGN PATENT DOCUMENTS

| | | |
|---|---|---|
| CN | 101710617 A | 5/2010 |
| CN | 101969111 A | 2/2011 |
| CN | 102034975 A | 4/2011 |
| CN | 102157731 A | 8/2011 |
| CN | 102219542 A | 10/2011 |
| CN | 102315440 A | 1/2012 |
| CN | 102339999 A | 2/2012 |
| CN | 102386439 A | 3/2012 |
| CN | 102723489 A | 10/2012 |
| CN | 102891314 A | 1/2013 |
| CN | 102969508 A | 3/2013 |
| CN | 103219517 A | 7/2013 |
| JP | 2011057541 A | 3/2011 |
| JP | 2012-254899 A | 12/2012 |

OTHER PUBLICATIONS

Zhong-Shuai Wu, et al., "Doped Graphene Sheets As Anode Materials with Superhigh Rate and Large Capacity for Lithium Ion Batteries", American Chemical Society, vol. 5, No. 7, Jun. 22, 2011, p. 5463-5471.

Long Qie, et al., "Nitrogen-Doped Porous Carbon Nanofiber Webs as Anodes for Lithium Ion Batteries with a Superhigh Capacity and Rate Capability", Advanced Materials, 2012, p. 2047-2050.

Hyung Mo Jeong, et al., "Silicon@Porous Nitrogen-doped Carbon Spheres Through a Bottom-up Approach Are Highly Robust Lithium-ion Battery Anodes", Electronic Supplementary Information (ESI) for RSC Advances, Mar. 7, 2012, 6 pages.

* cited by examiner

FIG. 1

- Carbon atom
- Pyrrolic nitrogen
- Graphite nitrogen
- Pyridinic nitrogen

CATHODE ACTIVE MATERIAL FOR LITHIUM-ION SECONDARY BATTERY AND PREPARATION METHOD THEREOF, CATHODE POLE PIECE FOR LITHIUM-ION SECONDARY BATTERY, AND LITHIUM-ION SECONDARY BATTERY

CROSS-REFERENCE TO RELATED APPLICATIONS

This application is a continuation of International Application No. PCT/CN2014/072477, filed on Feb. 25, 2014, which claims priority to Chinese Patent Application No. 201310323018.0, filed on Jul. 29, 2013, both of which are hereby incorporated by reference in their entireties.

TECHNICAL FIELD

The present invention relates to the field of lithium-ion secondary batteries, and in particular, to a cathode active material for a lithium-ion secondary battery and a preparation method thereof, a cathode pole piece for a lithium-ion secondary battery, and a lithium-ion secondary battery.

BACKGROUND

With an increasingly higher requirement for energy density of a portable electronic device and an electric automobile, a research and development of a high-performance lithium-ion secondary battery become increasingly important.

With a relatively high theoretical capacity (up to 4200 mAh/g) and a good intercalation/deintercalation capability, a pure silicon material becomes a most promising new-type cathode material for efficient lithium-ion storage. However, a volume of the silicon material changes by more than 300% during a lithium deintercalating and intercalating process, causing the silicon material to extremely easily fall from a current collector; in addition, the silicon material has a relatively low conductivity. Currently, the industry modifies the silicon material mainly by adopting four manners: nanocrystallizing, filming, compounding, and designing a special multi-level structure. However, effects are unsatisfactory, either because a preparation process is so complex that it is difficult to implement commercialization, or because the introduction of a large quantity of inactive substances greatly reduces the advantage of a high capacity of the pure silicon material.

SUMMARY

In view of this, embodiments of the present invention provides a new type of cathode active material for a lithium-ion secondary battery, solving a problem in the prior art that a silicon material, when used as a cathode active material, easily falls from a current collector due to a great volume change and has a low conductivity.

According to a first aspect, an embodiment of the present invention provides a cathode active material for a lithium-ion secondary battery, where the cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 μm, and the nanowire is 1-200 nm in diameter and 1-10 μm long. A micropore is arranged on the exterior, the interior, or both the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

Preferably, a mass ratio of the silicon-based active substance to the cathode active material for a lithium-ion secondary battery is 0.1%-80%.

Preferably, a ratio of the particle diameter of the silicon-based active substance nanoparticle to the aperture of the micropore is 1-10:1.

Preferably, the nitrogen-doped carbon material is in a shape of a three-dimensional network, and the nitrogen-doped carbon material includes a plurality of interlinked branches, where the branches range between 1 nm-10 μm in diameter.

Preferably, the nitrogen-doped carbon network includes pyrrolic nitrogen. The pyrrolic nitrogen in the nitrogen-doped carbon network can be bonded with $Li^+$, thereby having a good lithium-ion storage performance.

Preferably, a material of the silicon-based active substance is selected from one or more of simple substance silicon, silicon oxide and silicon alloy.

Compared with the prior art, the first aspect of the embodiment of the present invention provides a cathode active material for a lithium-ion secondary battery. A silicon-based active substance is encased in the interior of a nitrogen-doped carbon material, and the silicon-based active substance combines with a current collector by using the nitrogen-doped carbon material. A micropore is arranged on at least one of the exterior and the interior of the nitrogen-doped carbon material. The micropore of the nitrogen-doped carbon material can reserve space for expansion of the silicon-based active substance, and, constrained by the nitrogen-doped carbon material, an expanded silicon-based active substance may not fall off, thereby solving a problem in the prior art that a silicon material, when used as a cathode active material, easily falls from the current collector due to a great volume change and has a low conductivity, and greatly extending a service life of the cathode active material for a lithium-ion secondary battery. In addition, a nitrogen-doped carbon network can improve the overall conductivity of a composite material of the silicon-based active substance/nitrogen-doped carbon material; and the nitrogen-doped carbon network has a certain capacity, which, plus a high capacity of the silicon-based active substance, enables the cathode active material for a lithium-ion secondary battery to have an advantage of a high capacity. In addition, the cathode active material for a lithium-ion secondary battery has a relatively low cost and is ease of industrialized production.

According to a second aspect, an embodiment of the present invention provides a preparation method of a cathode active material for a lithium-ion secondary battery, where a cathode active material for a lithium-ion secondary battery is prepared according to one of the following methods:

Method 1: dispersing, by using a dispersant, a silicon-based active substance with a particle diameter of 1 nm-1 μm in solution to obtain a mixed solution; adding an oxidizer into the mixed solution and then adding an organic molecular monomer, where the organic molecular monomer is selected from one or more of a pyridine monomer, a pyrrole monomer, an aniline monomer, and a derivative of the pyridine monomer, the pyrrole monomer, or the aniline monomer, and the silicon-based active substance reacts with the organic molecular monomer to form a black precipitate; filtering the black precipitate and taking a filter residue; and then encasing the exterior of the silicon-based active substance in a nitrogen-doped carbon material by using a pyrolysis method, so as to obtain the cathode active material for a lithium-ion secondary battery;

Method 2: placing a silicon-based active substance with a particle diameter of 1 nm-1 µm in a tubular furnace; bringing in, by protective gas, a gasified organic molecular monomer, where the organic molecular monomer is selected from one or more of a pyridine monomer, a pyrrole monomer, an aniline monomer, and a derivative of the pyridine monomer, the pyrrole monomer, or the aniline monomer; and encasing the exterior of the silicon-based active substance in a nitrogen-doped carbon material by using a chemical vapor deposition method, so as to obtain the cathode active material for a lithium-ion secondary battery; and Method 3: mixing one or more organic molecules of the ionic liquid 3-methyl-butylpyridine di cyanamide or 1-ethyl-3-methylimidazole dicyanamide and a derivative of the 3-methyl-1-butylpyridine dicyanamide or the 1-ethyl-3-methylimidazole dicyanamide, with a silicon-based active substance with a particle diameter of 1 nm-1 µm to obtain a mixed solution; and then encasing the exterior of the silicon-based active substance in a nitrogen-doped carbon material by using an ionic liquid pyrolysis method, so as to obtain the cathode active material for a lithium-ion secondary battery.

The cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 µm, and the nanowire is 1-200 nm in diameter and 1-10 µm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

Preferably, in Method 1, the encasing the exterior of the silicon-based active substance in a nitrogen-doped carbon material by using a pyrolysis method is: drying the filter residue at 60-100° C. for 12-36 hours; placing the dried filter residue in a tubular furnace; introducing protective gas; and sintering the dried filter residue at 500-1300° C. for 1-6 hours.

Preferably, in Method 2, the encasing the exterior of the silicon-based active substance in a nitrogen-doped carbon material by using a chemical vapor deposition method is: setting a mass ratio of the silicon-based active substance to the organic molecular monomer to 1:1-10; controlling the amount of gas flow of the protective gas between 10-100 ml/min; heating the tubular furnace to 500-1300° C. inside at a heating rate of 10-50° C./min and preserving a temperature for 1-12 hours; and then cooling the tubular furnace to be in a room temperature.

Preferably, in Method 3, the encasing the exterior of the silicon-based active substance in a nitrogen-doped carbon material by using an ionic liquid pyrolysis method is: placing the mixed solution in a tubular furnace; evacuating the tubular furnace; introducing protective gas and controlling the amount of gas flow of the protective gas to be 10-100 ml/min; heating the tubular furnace to 500-1300° C. inside at a heating rate of 1-10° C./min and preserving a temperature for 1-6 hours; and then cooling the tubular furnace to be in a room temperature.

The preparation method of a cathode active material for a lithium-ion secondary battery that is provided according to the second aspect of the embodiment of the present invention is simple and convenient in process, has a relatively low cost, and is ease of industrialized production.

According to a third aspect, an embodiment of the present invention provides a cathode pole piece for a lithium-ion secondary battery, where the cathode pole piece for a lithium-ion secondary battery includes a current collector and a cathode active material for a lithium-ion secondary battery, where the cathode active material is coated on the current collector. The cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 µm, and the nanowire is 1-200 nm in diameter and 1-10 µm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

The cathode pole piece for a lithium-ion secondary battery that is provided according to the third aspect of the embodiment of the present invention has a long service life and a good conductivity.

According to a fourth aspect, an embodiment of the present invention provides a lithium-ion secondary battery, where the lithium-ion secondary battery is formed by a cathode pole piece, an anode pole piece, a membrane, a non-aqueous electrolyte and a casing. The cathode pole piece for a lithium-ion secondary battery includes a current collector and a cathode active material for a lithium-ion secondary battery, where the cathode active material is coated on the current collector. The cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 µm, and the nanowire is 1-200 nm in diameter and 1-10 µm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

The lithium-ion secondary battery provided according to the fourth aspect of the embodiment of the present invention has a long service life and a good conductivity.

In conclusion, a first aspect of an embodiment of the present invention provides a cathode active material for a lithium-ion secondary battery. A silicon-based active substance is encased in the interior of a nitrogen-doped carbon material, and the silicon-based active substance combines with a current collector by using the nitrogen-doped carbon material. A micropore is arranged on at least one of the exterior and the interior of the nitrogen-doped carbon material. The micropore of the nitrogen-doped carbon material can reserve space for expansion of the silicon-based active substance, and, constrained by the nitrogen-doped carbon material, an expanded silicon-based active substance may not fall off, thereby solving a problem in the prior art that a silicon material, when used as a cathode active material, easily falls from the current collector due to a great volume change and has a low conductivity, and greatly extending a service life of the cathode active material for a lithium-ion secondary battery. In addition, a nitrogen-doped carbon network can improve the overall conductivity of a composite material of the silicon-based active substance/nitrogen-doped carbon material; and the nitrogen-doped carbon network has a certain capacity, which, plus a high capacity of the silicon-based active substance, enables the cathode active material for a lithium-ion secondary battery to have an advantage of a high capacity. In addition, the cathode active material for a lithium-ion secondary battery has a relatively low cost and is ease of industrialized production. The preparation method of a cathode active material for a lithium-ion secondary battery that is provided according to the second aspect of the embodiment of the present invention is simple and convenient in process, has a relatively low cost, and is ease of industrialized production. The cathode pole piece for a lithium-ion secondary battery that is provided according to the third aspect of the embodiment of the present invention and the lithium-ion secondary battery provided according to the fourth aspect have a long service life and a good conductivity.

Advantages of embodiments of the present invention will be partially described in the following specification. Some are apparent according to the specification, or can be learnt according to implementation of the embodiments of the present invention.

DETAILED DESCRIPTION

The following descriptions are merely exemplary embodiments of the present invention. It should be noted that a person skilled in the art may further make some modifications and polishing without departing from the principle of the embodiments of the present invention, and the modifications and polishing should be construed as falling within the protection scope of the present invention.

A first aspect of an embodiment of the present invention provides a new type of cathode active material for a lithium-ion secondary battery, solving a problem in the prior art that a silicon material, when used as a cathode active material, easily falls from a current collector due to a great volume change and has a low conductivity. A second aspect of the embodiment of the present invention provides a preparation method of a cathode active material for a lithium-ion secondary battery, where the preparation method is simple and convenient in process, has a relatively low cost, and is ease of industrialized production. A third aspect of the embodiment of the present invention provides a cathode pole piece for a lithium-ion secondary battery that includes the cathode active material for a lithium-ion secondary battery, and a fourth aspect of the embodiment of the present invention provides a lithium-ion secondary battery that includes the cathode active material for a lithium-ion secondary battery.

In a first aspect, an embodiment of the present invention provides a cathode active material for a lithium-ion secondary battery, including a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 μm, and the nanowire is 1-200 nm in diameter and 1-10 μm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

Preferably, a mass ratio of the silicon-based active substance to the cathode active material for a lithium-ion secondary battery is 0.1%-80%. More preferably, a mass ratio of the silicon-based active substance to the cathode active material for a lithium-ion secondary battery is 5%-50%. Further preferably, a mass ratio of the silicon-based active substance to the cathode active material for a lithium-ion secondary battery is 15%-30%.

Preferably, the particle diameter of the silicon-based active substance nanoparticle is 1-200 nm.

Preferably, the nanowire of the silicon-based active substance is 1-50 nm in diameter and 1-5 μm long.

Preferably, the nitrogen-doped carbon material is in a shape of a three-dimensional network, and the nitrogen-doped carbon material includes a plurality of interlinked branches, where the branches are 1 nm-10 μm in diameter.

Preferably, the aperture of the micropore ranges between 2-100 nm.

Preferably, a ratio of the particle diameter of the silicon-based active substance nanoparticle to the aperture of the micropore is 1-10:1.

A micropore is arranged on the exterior or the interior of the nitrogen-doped carbon material, or a micropore is arranged on the exterior and the interior of the nitrogen-doped carbon material.

Preferably, the nitrogen-doped carbon network includes pyrrolic nitrogen. The pyrrolic nitrogen in the nitrogen-doped carbon network can be bonded with $Li^+$, thereby having a good lithium-ion storage performance.

Preferably, a material of the silicon-based active substance is selected from one or more of simple substance silicon, silicon oxide and silicon alloy.

Compared with the prior art, the first aspect of the embodiment of the present invention provides a cathode active material for a lithium-ion secondary battery. A silicon-based active substance is encased in the interior of a nitrogen-doped carbon material, and the silicon-based active substance combines with a current collector by using the nitrogen-doped carbon material. A micropore is arranged on at least one of the exterior and the interior of the nitrogen-doped carbon material. The micropore of the nitrogen-doped carbon material can reserve space for expansion of the silicon-based active substance, and, constrained by the nitrogen-doped carbon material, an expanded silicon-based active substance may not fall off, thereby solving a problem in the prior art that a silicon material, when used as a cathode active material, easily falls from the current collector due to a great volume change and has a low conductivity, and greatly extending a service life of the cathode active material for a lithium-ion secondary battery. In addition, a nitrogen-doped carbon network can improve the overall conductivity of a composite material of the silicon-based active substance/nitrogen-doped carbon material; and the nitrogen-doped carbon network has a certain capacity, which, plus a high capacity of the silicon-based active substance, enables the cathode active material for a lithium-ion secondary battery to have an advantage of a high capacity. In addition, the cathode active material for a lithium-ion secondary battery has a relatively low cost and is ease of industrialized production.

In a second aspect, an embodiment of the present invention provides a preparation method of a cathode active material for a lithium-ion secondary battery, where a cathode active material for a lithium-ion secondary battery is prepared according to one of the following methods:

Method 1: dispersing, by using a dispersant, a silicon-based active substance with a particle diameter of 1 nm-1 μm in solution to obtain a mixed solution; adding an oxidizer into the mixed solution and then adding an organic molecular monomer, where the organic molecular monomer is selected from one or more of a pyridine monomer, a pyrrole monomer, an aniline monomer, and a derivative of the pyridine monomer, the pyrrole monomer, or the aniline monomer; and the silicon-based active substance reacts with the organic molecular monomer to form a black precipitate; filtering the black precipitate and taking a filter residue; and then encasing the exterior of the silicon-based active substance in a nitrogen-doped carbon material by using a pyrolysis method, so as to obtain the cathode active material for a lithium-ion secondary battery;

Method 2: placing a silicon-based active substance with a particle diameter of 1 nm-1 μm in a tubular furnace; bringing in, by protective gas, a gasified organic molecular monomer, where the organic molecular monomer is selected from one or more of a pyridine monomer, a pyrrole monomer, an aniline monomer, and a derivative of the pyridine monomer, the pyrrole monomer, or the aniline monomer; and encasing the exterior of the silicon-based active substance in a nitrogen-doped carbon material by using a chemical vapor deposition method, so as to obtain the cathode active material for a lithium-ion secondary battery; and Method 3: mixing one or more organic molecules of the ionic liquid 3-methyl-1-butylpyridine dicyanamide or 1-ethyl-3-methylimidazole dicyanamide and a derivative of the 3-methyl-1-butylpyridine dicyanamide or the 1-ethyl-3-methylimidazole dicyanamide, with a silicon-based active substance with a particle diameter of 1 nm-1 μm to obtain a mixed solution; and encasing the exterior of the silicon-based active substance in a nitrogen-doped carbon material by using an ionic liquid pyrolysis method, so as to obtain the cathode active material for a lithium-ion secondary battery.

The cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 μm, and the nanowire is 1-200 nm in diameter and 1-10 μm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

Preferably, in Method 1, the encasing the exterior of the silicon-based active substance in a nitrogen-doped carbon material by using a pyrolysis method is: drying the filter residue at 60-100° C. for 12-36 hours; placing the dried filter residue in a tubular furnace; introducing protective gas; and sintering the dried filter residue at 500-1300° C. for 1-6 hours. The dispersant is used to disperse the silicon-based active substance with the particle diameter of 1 nm-1 μm in the solution; the oxidizer is added and then the organic molecular monomer is added, where the organic molecular monomer is selected from one or more of a pyridine monomer, a pyrrole monomer, an aniline monomer, and a derivative of the pyridine monomer, the pyrrole monomer, or the aniline monomer; and a mass ratio of the silicon-based active substance to the organic molecular monomer is 1-4:1-10; a temperature is preserved at 0-100° C. for reacting for 12-36 hours to form the black precipitate; the black precipitate is filtered and the filter residue is cleaned; then the filter residue is dried at 60-100° C. for 12-36 hours; the dried filter residue is placed in the tubular furnace; the protective gas is introduced; and the dried filter residue is sintered at 500-1300° C. for 1-6 hours to obtain the cathode active material for a lithium-ion secondary battery.

More preferably, $(C_{16}H_{33})N(CH_3)_3Br$ (CTAB, Cetyltrimethyl Ammonium Bromide) solution is prepared with 0.5-2 mol/L hydrochloric acid in an ice water bath; a silicon-based active substance with the particle diameter of 1 nm-1 μm is added; ultrasonic dispersion is performed for 10-60 minutes; then ammonium peroxydisulfate (APS) is added; after the mixture is stirred for 0.5-2 hours, and then a pyrrole monomer is added, where a mass ratio of silicon powder to pyrrole, APS, CTAB and hydrochloric acid is 1-4:1-10:1-10:1-6:10-20; a temperature is preserved at 0-5° C. for reacting for 12-36 hours to form the black precipitate; the black precipitate is filtered and the filter residue is cleaned; then the filter residue is dried at 60-100° C. for 12-36 hours; the dried filter residue is placed in the tubular furnace; the protective gas is introduced; and the dried filter residue is sintered at 500-1300° C. for 1-6 hours to obtain the cathode active material for a lithium-ion secondary battery.

Preferably, in Method 2, the encasing the exterior of the silicon-based active substance in a nitrogen-doped carbon material by using a chemical vapor deposition method is: setting a mass ratio of the silicon-based active substance to the organic molecular monomer to 1:1-10; controlling the amount of gas flow of the protective gas to be 10-100 ml/min; heating the tubular furnace to 500-1300° C. inside at a heating rate of 10-50° C./min and preserving a temperature for 1-12 hours; and then cooling the tubular furnace to be in a room temperature. The silicon-based active substance with the particle diameter of 1 nm-1 μm is placed in the tubular furnace and the tubular furnace is evacuated; the protective gas is used to bring in the gasified organic molecular monomer, where the organic molecular monomer is selected from one or more of a pyridine monomer, a pyrrole monomer, an aniline monomer, and a derivative of the pyridine monomer, the pyrrole monomer, or the aniline monomer, and aniline monomer; a mass ratio of the silicon-based active substance to the organic molecular monomer is 1:1-10; the amount of gas flow of the protective gas is controlled to be 10-100 ml/min; the tubular furnace is heated to 500-1300° C. inside at a heating rate of 10-50° C./min and a temperature is preserved for 1-12 hours; and then the tubular furnace is cooled to be in a room temperature to obtain the cathode active material for a lithium-ion secondary battery.

More preferably, the silicon-based active substance with the particle diameter of 1 nm-1 μm is placed in a quartz tube, then the quartz tube is placed in the tubular furnace and the tubular furnace is evacuated to $0\text{-}10^{-2}$ Pa; the protective gas is used to bring in the gasified pyridine monomer; a mass ratio of the silicon-based active substance to the organic molecular monomer is 1:1-10; the amount of gas flow of the protective gas is controlled to be 10-100 ml/min; the tubular furnace is heated to 500-1300° C. inside at a heating rate of 10-50° C./min and a temperature is preserved for 1-12 hours; and then the tubular furnace is cooled to be in a room temperature to obtain the cathode active material for a lithium-ion secondary battery.

Preferably, in Method 3, the encasing the exterior of the silicon-based active substance in a nitrogen-doped carbon material by using an ionic liquid pyrolysis method is: placing the mixed solution in a tubular furnace; evacuating the tubular furnace; introducing protective gas and controlling the amount of gas flow of the protective gas to be 10-100 ml/min; heating the tubular furnace to 500-1300° C. inside at a heating rate of 1-10° C./min and preserving a temperature for 1-6 hours; and then cooling the tubular furnace to be in a room temperature. In a dry atmosphere, one or more organic molecules of the ionic liquid 3-methyl-1-butylpyridine dicyanamide or 1-ethyl-3-methylimidazole dicyanamide and a derivative of the 3-methyl-1-butylpyridine dicyanamide or the 1-ethyl-3-methylimidazole dicyanamide are oscillated and mixed with the silicon-based active substance with the particle diameter of 1 nm-1 μm, where a mass ratio of the organic molecule to the silicon-based active substance is 0.5-10:1; then the mixture is placed in the tubular furnace and the tubular furnace is evacuated; the protective gas is introduced and the amount of gas flow of the protective gas is controlled to be 10-100 ml/min; the tubular furnace is heated to 500-1300° C. inside at a heating rate of 1-10° C./min and a temperature is preserved for 1-6 hours; and then the tubular furnace is cooled to be in a room temperature to obtain the cathode active material for a lithium-ion secondary battery.

More preferably, in a dry atmosphere, one or more organic molecules of the ionic liquid 3-methyl-1-butylpyridine dicyanamide or 1-ethyl-3-methylimidazole dicyanamide and a derivative of the 3-methyl-1-butylpyridine dicyanamide or the 1-ethyl-3-methylimidazole dicyanamide are oscillated and mixed with the silicon-based active substance with the particle diameter of 1 nm-1 μm for 30-120 minutes, where a mass ratio of the organic molecule to the silicon-based active substance is 0.5-10:1; then the mixture is placed in a crucible, the crucible is placed in the tubular furnace, and the tubular furnace is evacuated to $0\text{-}10^{-2}$ Pa; protective gas is introduced and the amount of gas flow of the protective gas is controlled to be 10-100 ml/min; the tubular furnace is heated to 500-1300° C. inside at a heating rate of 1-10° C./min and a temperature is preserved for 1-6 hours; and then the tubular furnace is cooled to be in a room temperature to obtain the cathode active material for a lithium-ion secondary battery.

An organic molecular monomer is selected from one or more of a pyridine monomer, a pyrrole monomer, an aniline monomer, and a derivative of the pyridine monomer, the pyrrole monomer, or the aniline monomer or selected from one or more of the ionic liquid 3-methyl-1-butylpyridine dicyanamide or 1-ethyl-3-methylimidazole dicyanamide and a derivative of the 3-methyl-1-butylpyridine dicyanamide or the 1-ethyl-3-methylimidazole dicyanamide. As a carbon source, an organic molecule forms a nitrogen-doped carbon network during pyroprocessing, where a nitrogen atom and a carbon atom in the nitrogen-doped carbon network are bonded in at least one form of pyridinic nitrogen, graphite nitrogen and pyrrolic nitrogen. In addition, during a process of pyrolysis, the organic molecule decomposes into small molecular gas, and the small molecular gas escapes from the exterior of the nitrogen-doped carbon material, thereby forming a micropore structure on the exterior or the interior of the nitrogen-doped carbon material, or on the exterior and the interior of the nitrogen-doped carbon material.

Preferably, a mass ratio of the silicon-based active substance to the cathode active material for a lithium-ion secondary battery is 0.1%-80%. More preferably, a mass ratio of the silicon-based active substance to the cathode active material for a lithium-ion secondary battery is 5%-50%. Further preferably, a mass ratio of the silicon-based active substance to the cathode active material for a lithium-ion secondary battery is 15%-30%.

Preferably, the particle diameter of the silicon-based active substance nanoparticle is 1-200 nm, and the nanowire of the silicon-based active substance is 1-50 nm in diameter and 1-5 μm long.

Preferably, the aperture of the micropore ranges between 2-100 nm.

Preferably, a ratio of the particle diameter of the silicon-based active substance nanoparticle to the aperture of the micropore is 1-10:1.

Preferably, the nitrogen-doped carbon material is in a shape of a three-dimensional network, and the nitrogen-doped carbon material includes a plurality of interlinked branches, where the branches are 1 nm-10 μm in diameter.

Preferably, the nitrogen-doped carbon network includes pyrrolic nitrogen. The pyrrolic nitrogen in the nitrogen-doped carbon network can be bonded with $Li^+$, thereby having a good lithium-ion storage performance.

Preferably, a material of the silicon-based active substance is selected from one or more of simple substance silicon, silicon oxide and silicon alloy.

The preparation method of a cathode active material for a lithium-ion secondary battery that is provided according to the second aspect of the embodiment of the present invention is simple and convenient in process, has a relatively low cost, and is ease of industrialized production.

In a third aspect, an embodiment of the present invention provides a cathode pole piece for a lithium-ion secondary battery, where the cathode pole piece for a lithium-ion secondary battery includes a current collector and a cathode active material for a lithium-ion secondary battery, where the cathode active material is coated on the current collector. The cathode active material for a lithium-ion secondary battery includes a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 µm, and the nanowire is 1-200 nm in diameter and 1-10 µm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

The cathode pole piece for a lithium-ion secondary battery that is provided according to the third aspect of the embodiment of the present invention has a long service life and a good conductivity. An exemplary manner of the cathode active material for a lithium-ion secondary battery is the same as that in the first aspect.

In a fourth aspect, an embodiment of the present invention provides a lithium-ion secondary battery, where the lithium-ion secondary battery is formed by a cathode pole piece, an anode pole piece, a membrane, a non-aqueous electrolyte and a casing. The cathode pole piece for a lithium-ion secondary battery includes a current collector and a cathode active material for a lithium-ion secondary battery, where the cathode active material is coated on the current collector. The cathode active material for a lithium-ion secondary battery a silicon-based active substance and a nitrogen-doped carbon material. The silicon-based active substance is encased in the interior of the nitrogen-doped carbon material, and the silicon-based active substance is one or more of a nanoparticle and a nanowire, where a particle diameter of the silicon-based active substance nanoparticle is 1 nm-1 µm, and the nanowire is 1-200 nm in diameter and 1-10 µm long. A micropore is arranged on at least one of the exterior and the interior of the nitrogen-doped carbon material, and an aperture of the micropore ranges between 0.5-500 nm. A material of the nitrogen-doped carbon material is a nitrogen-doped carbon network, where a nitrogen atom and a carbon atom in the nitrogen-doped carbon network are bonded in at least one form of pyridinic nitrogen, graphite nitrogen and pyrrolic nitrogen.

The lithium-ion secondary battery provided according to the fourth aspect of the embodiment of the present invention has a long service life and a good conductivity. An exemplary manner of the cathode active material for a lithium-ion secondary battery is the same as that in the first aspect.

The following further describes the embodiments of the present invention with a plurality of embodiments. The embodiments of the present invention are not limited to the following specific embodiments. Implementation may be changed appropriately within the scope of not changing a principal right.

Embodiment 1

A preparation method of a cathode active material for a lithium-ion secondary battery includes the following steps:

dissolve Cetyltrimethyl Ammonium Bromide (CTAS, $(C_{16}H_{33})N(CH_3)_3Br$, 7.3 g) in an HCl (120 mL, 1 mol/L) solution in an ice water bath; then add 1 g silicon powder with a particle diameter of 10 nm; perform ultrasonic dispersion for 30 minutes; add ammonium peroxydisulfate (APS, 13.7 g), immediately forming a white suspension; stir the mixture for 0.5 hours, and then add a pyrrolic monomer (Py, 12 mL) into the suspension and preserve a temperature at 4° C. for reacting for 24 hours to form a black precipitate; filter the black precipitate; clean the obtained filter residue by using the 1 mol/L HCl solution for three times; clean the filter residue by using purified water until the suspension is colorless and neutral; then dry the filter residue at 80° C. for 24 hours; place a dried filter residue in a tubular furnace; introduce 5% $H_2$/Ar mixture; and sinter the filter residue at 700° C. for 2 hours to obtain the cathode active material for a lithium-ion secondary battery.

Figure 1:
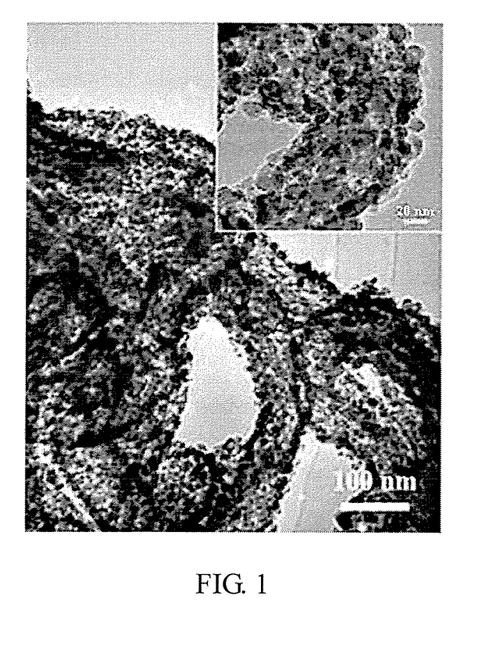
FIG. 1 is a TEM electron micrograph of a cathode active material for a lithium-ion secondary battery that is obtained according to Embodiment 1 of the present invention.

The cathode active material for a lithium-ion secondary battery includes a silicon-based active substance and a nitrogen-doped carbon material, where the silicon-based active substance is encased in the interior of the nitrogen-doped carbon material. According to an X-ray diffraction (XRD) analysis, the silicon-based active substance in the cathode active material for a lithium-ion secondary battery is simple substance silicon, and a mass ratio of the simple substance silicon is 25.3% as measured by using an ammonium chloride gravimetric method. Amicropore is arranged on at least one of the exterior and the interior of the nitrogen-doped carbon material. An aperture of the micropore ranges between 0.5-4 nm as calculated according to Brunauer-Emmett-Teller (BET) and Barrett-JoynerHalenda (BJH) by using a nitrogen adsorption method. According to an X-ray Photoelectron Spectroscopy (XPS) analysis, a nitrogen atom exists in a form of pyridinic nitrogen and pyrrolic nitrogen. FIG. 1 is a TEM electron micrograph of a cathode active material for a lithium-ion secondary battery that is obtained according to an embodiment of the present invention. As shown in FIG. 1, the cathode active material for a lithium-ion secondary battery includes a silicon-based active substance and a nitrogen-doped carbon material. The nitrogen-doped carbon material is in a shape of a three-dimensional network, and the nitrogen-doped carbon material includes a plurality of interlinked branches, where the branches are 50 nm-80 nm in diameter. The structure fully utilizes a three-dimensional conductive network of the nitrogen-doped carbon material, and a low conductivity of the silicon-based active substance hardly has an effect on the overall conductive property of the material. In addition, the micropore of the nitrogen-doped carbon material can effectively reduce impact of a volume change of the silicon-based active substance on the overall life of the material.

Embodiment 2

A preparation method of a cathode active material for a lithium-ion secondary battery includes the following steps:

place 3 g silicon powder with a particle diameter of 200 nm in a quartz tube and place the quartz tube in a tubular furnace; evacuate the tubular furnace; introduce Ar that is loaded with a gasified pyridine monomer (pyridine, 10 g) to serve as reaction gas and control the amount of gas flow of the Ar to be 50 ml/min; heat the tubular furnace to 700° C. inside at a heating rate of 30° C./min and preserve the temperature for 6 hours; and then cool the tubular furnace to be in a room temperature to obtain a cathode active material for a lithium-ion secondary battery.

Figure 2:
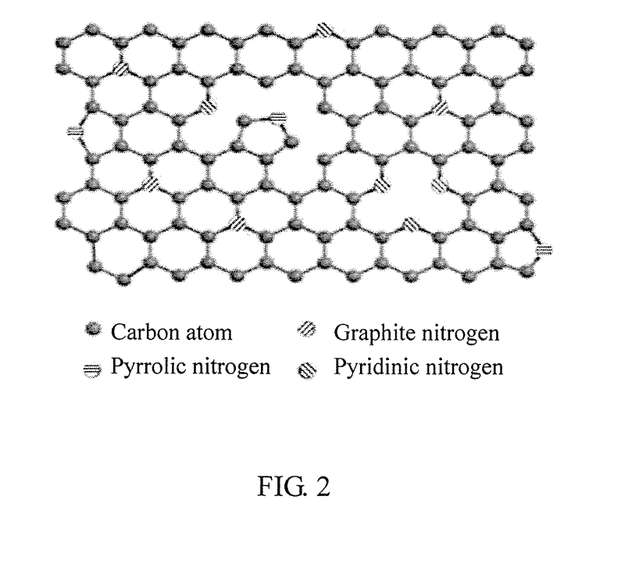
FIG. 2 is a schematic structural diagram of a nitrogen-doped carbon network in a cathode active material for a lithium-ion secondary battery that is obtained according to Embodiment 2 of the present invention.

The cathode active material for a lithium-ion secondary battery includes a silicon-based active substance and a nitrogen-doped carbon material. The silicon-based active substance is encased in the interior of the nitrogen-doped carbon material. According to an XRD analysis, the silicon-based active substance in the cathode active material for a lithium-ion secondary battery is simple substance silicon, and a mass ratio of the simple substance silicon is 53.6% as measured by using an ammonium chloride gravimetric method. A micropore is arranged on at least one of the exterior and the interior of the nitrogen-doped carbon material. An aperture of the micropore ranges between 20-50 nm as calculated according to BET and BJH by using a nitrogen adsorption method. According to an XPS analysis, a nitrogen atom exists in three forms: pyridinic nitrogen, pyrrolic nitrogen and graphite nitrogen. From a perspective of Transmission Electron Microscopy (TEM), the nitrogen-doped carbon material is in a shape of a three-dimensional network, and the nitrogen-doped carbon material includes a plurality of interlinked branches, where the branches are 300-500 nm in diameter. FIG. 2 is a schematic structural diagram of a nitrogen-doped carbon network in a cathode active material for a lithium-ion secondary battery that is obtained according to another embodiment of the present invention. As shown in FIG. 2, a nitrogen atom and a carbon atom in the nitrogen-doped carbon network are generally bonded in various forms of pyridinic nitrogen, graphite nitrogen and pyrrolic nitrogen.

Embodiment 3

A preparation method of a cathode active material for a lithium-ion secondary battery includes the following steps:

in a dry atmosphere, add 5 g of the ionic liquid 3-methyl-1-butylpyridine dicyanamide (3-methyl-1-butylpyridine dicyanamide) into 1 g silicon powder with a particle diameter of 100 nm; oscillate the mixture in an oscillation mixer for 60 minutes; transfer the mixture into a crucible and place the crucible in a tubular furnace; introduce argon and control the amount of gas flow of the argon to be 10 ml/min; heat the tubular furnace to 600° C. inside at a heating rate of 2° C./min and preserve the temperature for 2 hours to fully break down the ionic liquid; and then cool the tubular furnace to be in a room temperature to obtain a cathode active material for a lithium-ion secondary battery.

The cathode active material for a lithium-ion secondary battery includes a silicon-based active substance and a nitrogen-doped carbon material. The silicon-based active substance is encased in the interior of the nitrogen-doped carbon material. According to an XRD analysis, the silicon-based active substance in the cathode active material for a lithium-ion secondary battery is simple substance silicon, and a mass ratio of the simple substance silicon is 29.9% as measured by using an ammonium chloride gravimetric method. A micropore is arranged on at least one of the exterior and the interior of the nitrogen-doped carbon material. An aperture of the micropore ranges between 10-50 nm as calculated according to BET and BJH by using a nitrogen adsorption method. From a perspective of TEM, the nitrogen-doped carbon material is in a shape of a three-dimensional network, and the nitrogen-doped carbon material includes a plurality of interlinked branches, where the branches are 100-200 nm in diameter. According to an XPS analysis, a nitrogen atom exists in three forms: pyridinic nitrogen, pyrrolic nitrogen and graphite nitrogen.

Comparative Example 1

Place 3 g silicon powder with a particle diameter of 200 nm in a quartz tube and place the quartz tube in a tubular furnace; evacuate the tubular furnace; introduce Ar/Methane (a volume ratio is 8:2) to serve as reaction gas and control the amount of gas flow to 50 ml/min; heat the tubular furnace to 700° C. inside at a heating rate of 30° C./min and preserve the temperature for 6 hours; and then cool the tubular furnace to be in a room temperature to obtain a cathode active material for a lithium-ion secondary battery.

Comparative Example 2

A preparation method of a cathode active material for a lithium-ion secondary battery includes the following steps:

dissolve Cetyltrimethyl Ammonium Bromide (CTAB, $(C_{16}H_{33})N(CH_3)_3Br$, 7.3 g) in an HCl (120 mL, 1 mol/L) solution in an ice water bath; then add 1 g silicon powder with a particle diameter of 1 μm; perform ultrasonic dispersion for 30 minutes; add ammonium peroxydisulfate (APS, 13.7 g), immediately forming a white suspension; stir the mixture for 0.5 hours, and then add a pyrrole monomer (Py, 12 mL) into the suspension; preserve a temperature at 4° C. for reacting for 24 hours to form a black precipitate; filter the black precipitate; clean the obtained filter residue by using the 1 mol/L HCl solution for three times; clean the filter residue by using purified water until the suspension is colorless and neutral; then dry the filter residue at 80° C. for 24 hours; place a dried filter residue in a tubular furnace; introduce 5% $H_2$/Ar mixture; sinter the filter residue at 700° C. for 2 hours to obtain a cathode active material for a lithium-ion secondary battery.

According to an XRD analysis, the silicon-based active substance in the cathode active material for a lithium-ion secondary battery is simple substance silicon, and a mass ratio of the simple substance silicon is 28.3% as measured by using an ammonium chloride gravimetric method. An aperture of the micropore ranges between 0.5-4 nm as calculated according to BET and BJH by using a nitrogen adsorption method. From a perspective of TEM, a nitrogen-doped carbon material is in a shape of a three-dimensional network, and the nitrogen-doped carbon material includes a plurality of interlinked branches, where a framework of the branch is 50-80 nm in diameter. According to an XPS analysis, a nitrogen atom exists in a form of pyridinic nitrogen and pyrrolic nitrogen.

Comparative Example 3

A preparation method of a cathode active material for a lithium-ion secondary battery includes the following steps:

in a dry atmosphere, add 5 g of the ionic liquid 3-methyl-1-butylpyridine dicyanamide(3-methyl-1-butylpyridine dicyanamide) into 1 g silicon powder with a particle diameter of 200 nm; oscillate the mixture in an oscillation mixer for 60 minutes to obtain a gritty mixture; transfer the gritty mixture into a crucible and place the crucible in a tubular furnace; introduce argon and control the amount of gas flow of argon to be 30 ml/min; heat the tubular furnace to 1000° C. inside at a heating rate of 30° C./min and preserve the temperature for 2 hours to fully break down the ionic liquid; and then cool the tubular furnace to be in a room temperature to obtain a cathode active material for a lithium-ion secondary battery.

According to an XRD analysis, the silicon-based active substance in the cathode active material for a lithium-ion secondary battery is simple substance silicon, and a mass ratio of the simple substance silicon is 31.9% as measured by using an ammonium chloride gravimetric method. An aperture of the micropore ranges between 0.5-1 μm as calculated according to BET and BJH by using a nitrogen adsorption method. From a perspective of TEM, a nitrogen-doped carbon material is in a shape of a three-dimensional network, and the nitrogen-doped carbon material includes a plurality of interlinked branches, where the branches are 10-20 μm in diameter. According to an XPS analysis, a nitrogen atom exists in three forms: pyridinic nitrogen, pyrrolic nitrogen and graphite nitrogen.

Preparation of a Cathode Pole Piece for a Lithium-Ion Secondary Battery

Uniformly mix the cathode active material for a lithium-ion secondary battery that is obtained according to Embodiment 1 with a conductive additive (Timcal, Super-p and SFG-6); then add 8% polyvinylidene fluoride PVDF (Arkmer, HSV900), and N-Methyl pyrrolidone solution NMP, and stir the mixture uniformly; coat the foregoing mixture size evenly on 10 μm of a copper foil current collector; and bake the copper foil current collector at 110° C. under vacuum for 12 hours to obtain a cathode pole piece for a lithium-ion secondary battery. A formula (a mass ratio) for the cathode mixture size for the cathode pole piece for the lithium-ion secondary battery is: Cathode active material for a lithium-ion secondary battery:super-p:SFG-6:PVDF=92:3:1:4.

Preparation of a Lithium-Ion Secondary Battery

Manufacture the cathode pole piece for a lithium-ion secondary battery into a 2016-type button battery, where an electrode adopts a lithium metal, a membrane is celgard C2400, and an electrolyte is 1.3 M LiPF$_6$ EC and DEC (a volume ratio is 3:7) solution.

The cathode active materials for a lithium-ion secondary battery that are obtained according to Embodiment 2, Embodiment 3 and Comparison Example 1-Comparison Example 3 are handled in a same way.

Effect Embodiments

To strongly support a beneficial effect of the embodiments of the present invention, the following effect embodiments are provided to evaluate the performance of products provided in the embodiments of the present invention.

Charge a button-type lithium-ion secondary battery obtained according to Embodiment 1-Embodiment 3 and Comparison Example 1-Comparison Example 3 to 0.001 V with a current of 100 mA/1 g active substance, and then keep the voltage constant until the current is less than that of 10 mA/1 g; lay the button-type lithium-ion secondary battery aside for 10 minutes; and discharge the foregoing button battery to 2.5 V with a current of 100 mA/1 g active substance. Record the foregoing charging and discharging processes as one charging/discharging cycle. Formulas of an initial coulombic efficiency and a capacity retention rate of the button-type lithium-ion secondary battery are as follows respectively and results are recorded in Table 1:

Initial coulombic efficiency (%)=First charge capacity/First discharge capacity×100%;

Capacity retention rate of the n-th cycle (%)=Discharge capacity of the n-th cycle/Discharge capacity of the first cycle×100%.

TABLE 1

Test Results of the Button-type Lithium-ion Secondary Battery

| | First cycle | | | 50th cycle | | | |
|---|---|---|---|---|---|---|---|
| | Discharge capacity (mAh/g) | Charge capacity (mAh/g) | Initial coulombic efficiency (%) | Discharge capacity (mAh/g) | Charge capacity (mAh/g) | Discharge efficiency (%) | Capacity retention rate (%) |
| Embodiment 1 | 2100 | 1443 | 68.7% | 1399 | 1371 | 98 | 95 |
| Embodiment 2 | 2582 | 1560 | 60.4% | 1433 | 1404 | 98 | 90 |
| Embodiment 3 | 1532 | 997 | 65.1% | 935 | 907 | 97 | 91 |
| Comparative Example 1 | 2060 | 1077 | 52.3% | 692 | 657 | 95 | 61 |
| Comparative Example 2 | 2052 | 1131 | 55.1% | 902 | 848 | 94 | 75 |
| Comparative Example 3 | 1412 | 726 | 51.4% | 564 | 530 | 94 | 73 |

As can be seen from Table 1, compared with a silicon/carbon composite, the cathode active material for a lithium-ion secondary battery that is obtained at the same temperature according to Comparison Example 1, the cathode active materials for a lithium-ion secondary battery that are obtained according to Embodiment 1-Embodiment 3 of the present invention have a long cycling life, a high capacity, and a high initial efficiency, because a nitrogen-doped carbon network has a higher capacity and conductivity than carbon, and a micropore of a nitrogen-doped carbon material can efficiently reduce impact of a volume change of a silicon-based active substance on the overall life of the material. Compared with the cathode active materials for a lithium-ion secondary battery that are obtained at the same temperature according to Comparison Examples 2 and 3, the cathode active materials for a lithium-ion secondary battery that are obtained according to Embodiment 1-Embodiment 3 of the present invention have a more reasonable match as regarding a size of a silicon-based active substance nanoparticle, a diameter of branches of a nitrogen-doped carbon material and an aperture range of a micropore of the nitrogen-doped carbon material, and have a higher conductivity, higher capacity, higher initial efficiency and a longer cycling life.

What is claimed is:
1. A cathode active material for a lithium-ion secondary battery, the cathode active material comprising:
   a silicon-based active substance comprising one or more of nanoparticles or nanowires;
   a nitrogen-doped carbon material comprising a nitrogen-doped carbon network, wherein the nitrogen-doped carbon material comprises a plurality of interlinked branches formed by the nitrogen-doped carbon net- work, the silicon-based active substance is encased in an interior of the nitrogen-doped carbon material, wherein a particle diameter of the silicon-based active substance nanoparticle is 1 nm-1 μm, and the nanowire is 1-200 nm in diameter and 1-10 μm long;

micropores arranged on at least one of an exterior or an interior of the plurality of interlinked branches of the nitrogen-doped carbon material, wherein an aperture of the micropore ranges between 0.5-500 nm;

wherein a nitrogen atom and a carbon atom in the nitrogen-doped carbon network are bonded in at least one form of pyridinic nitrogen, graphite nitrogen or pyrrolic nitrogen; and wherein a mass ratio of the silicon-based active substance to the cathode active material is 5%-50%.

2. The cathode active material for a lithium-ion secondary battery according to claim 1, wherein a ratio of the particle diameter of the silicon-based active substance nanoparticle to the aperture of the micropore is 1-10:1.

3. The cathode active material for a lithium-ion secondary battery according to claim 1, wherein the branches are 1 nm-10 μm in diameter.

4. The cathode active material for a lithium-ion secondary battery according to claim 1, wherein the nitrogen-doped carbon network comprises pyrrolic nitrogen.

5. The cathode active material for a lithium-ion secondary battery according to claim 1, wherein the material of the silicon-based active substance is selected from one or more of simple substance silicon, silicon oxide or silicon alloy.

6. A cathode pole piece for a lithium-ion secondary battery, the cathode pole piece comprising:

a current collector;

a cathode active material coated on the current collector and comprising a silicon-based active substance and a nitrogen-doped carbon material, wherein the silicon-based active substance is encased in an interior of the nitrogen-doped carbon material, and the silicon-based active substance comprising one or more of nanoparticles or nanowires, wherein a particle diameter of the silicon-based active substance nanoparticle is 1 nm-1 μm, and the nanowire is 1-200 nm in diameter and 1-10 μm long;

micropores arranged on at least one of an exterior or the interior of the nitrogen-doped carbon material, and wherein an aperture of the micropore ranges between 0.5-500 nm; and a material of the nitrogen-doped carbon material is a nitrogen-doped carbon network, wherein a nitrogen atom and a carbon atom in the nitrogen-doped carbon network are bonded in at least one form of pyridinic nitrogen, graphite nitrogen or pyrrolic nitrogen;

wherein the nitrogen-doped carbon material is in a shape of a three-dimensional network and the nitrogen-doped carbon material comprises a plurality of interlinked branches, the micropores are arranged on the plurality of interlinked branches of the nitrogen-doped carbon material; and wherein a mass ratio of the silicon-based active substance to the cathode active material is 5%-50%.

7. A lithium-ion secondary battery comprising:

an anode pole piece;

a membrane;

a non-aqueous electrolyte and a casing; and a cathode pole piece, wherein the cathode pole piece comprises:

a current collector;

a cathode active material coated on the current collector and comprising a silicon-based active substance and a nitrogen-doped carbon material, wherein the silicon-based active substance is encased in an interior of the nitrogen-doped carbon material, and the silicon-based active substance comprising one or more of nanoparticles or nanowires, and wherein a particle diameter of the silicon-based active substance nanoparticle is 1 nm-1 μm, and the nanowire is 1-200 nm in diameter and 1-10 μm long;

a micropore arranged on at least one of an exterior or the interior of the nitrogen-doped carbon material, and wherein an aperture of the micropore ranges between 0.5-500 nm; and a material of the nitrogen-doped carbon material is a nitrogen-doped carbon network, wherein a nitrogen atom and a carbon atom in the nitrogen-doped carbon network are bonded in at least one form of pyridinic nitrogen, graphite nitrogen or pyrrolic nitrogen;

wherein the nitrogen-doped carbon material is in a shape of a three-dimensional network and the nitrogen-doped carbon material comprises a plurality of interlinked branches, the micropores are arranged on the plurality of interlinked branches of the nitrogen-doped carbon material; and wherein a mass ratio of the silicon-based active substance to the cathode active material is 5%-50%.

* * * * *